US012560295B2

(12) United States Patent
Mochizuki et al.

(10) Patent No.: US 12,560,295 B2
(45) Date of Patent: Feb. 24, 2026

(54) VEHICLE LAMP

(71) Applicant: KOITO MANUFACTURING CO., LTD., Tokyo (JP)

(72) Inventors: Kazuma Mochizuki, Shizuoka (JP); Yoshimasa Sugiura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/714,629

(22) PCT Filed: Dec. 1, 2022

(86) PCT No.: PCT/JP2022/044444
§ 371 (c)(1),
(2) Date: Nov. 4, 2024

(87) PCT Pub. No.: WO2023/100987
PCT Pub. Date: Jun. 8, 2023

(65) Prior Publication Data
US 2025/0305650 A1 Oct. 2, 2025

(30) Foreign Application Priority Data
Dec. 3, 2021 (JP) ................................ 2021-197337

(51) Int. Cl.
*F21S 41/29* (2018.01)
*F21S 41/143* (2018.01)
*F21S 41/27* (2018.01)

(52) U.S. Cl.
CPC ........... *F21S 41/295* (2018.01); *F21S 41/143* (2018.01); *F21S 41/27* (2018.01)

(58) Field of Classification Search
CPC ......... F21S 41/143; F21S 41/27; F21S 41/295
USPC ................................ 362/277, 278, 319, 320
See application file for complete search history.

(56) References Cited

U.S. PATENT DOCUMENTS 10,495,279 B2 * 12/2019 Dinant ................ B60Q 1/0683

FOREIGN PATENT DOCUMENTS

JP 2021-125410 A 8/2021
KR 10-2007-0041821 A 4/2007
WO WO-2020250758 A1 * 12/2020 ............. F21S 41/25

OTHER PUBLICATIONS

International Search Report for PCT/JP2022/044444 dated Jan. 31, 2023.

* cited by examiner

*Primary Examiner* — Thomas M Sember
(74) *Attorney, Agent, or Firm* — Sughrue Mion, PLLC

(57) ABSTRACT

A vehicle lamp (1) includes: a lens unit (55) having at least one lens; a holder (100) having a cylindrical support portion (101) to which the lens unit (55) is fixed inside, and a protrusion (**101*b*) provided closer to a front end of the support portion (101) than the lens unit (55) and protruding inward of the support portion (101); a locking portion (110) provided in the support portion (101) and elastically deformable in a radial direction of the support portion (101); and a locked portion (120) provided in the lens unit (55) and locked to the locking portion (110), in which the locking portion (110) presses the locked portion (120) toward the front end of the support portion (101), and the lens unit (55) is sandwiched between the locking portion (110) and the protrusion (101*b***).

4 Claims, 7 Drawing Sheets

VEHICLE LAMP

CROSS REFERENCE TO RELATED APPLICATIONS

This application is a National Stage of International Application No. PCT/JP2022/044444 filed Dec. 1, 2022, claiming priority based on Japanese Patent Application No. 2021-197337 filed Dec. 3, 2021.

TECHNICAL FIELD

The present invention relates to a vehicle lamp.

BACKGROUND ART

An optical unit including a lens unit having a plurality of lenses and a holder supporting the lens unit has been known, and Patent Literature 1 below discloses a vehicle lamp including such an optical unit. The optical unit according to Patent Literature 1 includes a lens unit and a cylindrical holder, the lens unit being fixed to the holder inside by a metal fitting or a clip provided separately from the holder.

[Patent Literature 1] JP 2021-125410 A

SUMMARY OF INVENTION

In the optical unit according to Patent Literature 1, the lens unit is fixed to the holder by using a metal fitting or a clip provided separately from the holder as described above, but there is a demand for easily fixing the lens unit.

Therefore, an object of the present invention is to provide a vehicle lamp capable of easily fixing a lens unit.

In order to achieve the aforementioned object, a vehicle lamp according to the present invention includes: a lens unit having at least one lens; a holder including a cylindrical support portion to which the lens unit is fixed inside, and a protrusion provided closer to a front end of the support portion than the lens unit and protruding inward of the support portion; a locking portion provided in the support portion and elastically deformable in a radial direction of the support portion; and a locked portion provided in the lens unit and locked to the locking portion, in which the locking portion presses the locked portion toward the front end of the support portion, and the lens unit is sandwiched between the locking portion and the protrusion.

In the above-described configuration, since the lens unit is directly held by the holder, a movement of the lens unit can be suppressed. In addition, since the locked portion locked to the locking portion is pressed by the locking portion toward the front end of the support portion and the lens unit is sandwiched between the locking portion and the protrusion, a movement of the lens unit can be suppressed. Therefore, the lens unit can be easily fixed as compared with a case where the lens unit fixed to the holder using a metal fitting or a clip provided separately from the holder.

The holder may further include a fixing portion fixed to a member outside the holder.

According to the above-described configuration, since the holder is fixed to the external member, the holder is firmly fixed to the external member as compared with a case where the holder is fixed to another member fixed to the external member. Therefore, displacement of the lens unit fixed to the support portion inside can be suppressed.

A vehicle lamp according to the present invention includes: a lens unit having at least one lens; a first holder including a cylindrical support portion to which the lens unit is fixed inside, and a protrusion provided closer to a front end of the support portion than the lens unit and protruding inward of the support portion; a second holder disposed closer to a rear end of the support portion than the lens unit inside the support portion; a locking portion provided in one of the support portion and the second holder and elastically deformable in a radial direction of the support portion; and a locked portion provided in the other one of the support portion and the second holder and locked to the locking portion, in which when the locking portion is locked to the locked portion, the second holder presses a rear surface of the lens unit toward a front end of the first holder, and the lens unit is sandwiched between the second holder and the protrusion.

In the above-described configuration, since the second holder presses the rear surface of the lens unit toward the front end of the first holder, and the lens unit is sandwiched between the second holder and the protrusion by locking the locking portion to the locked portion, the movement of the lens unit can be suppressed. Therefore, the lens unit can be easily fixed as compared with a case where the lens unit fixed to the holder using a metal fitting or a clip provided separately from the holder.

The first holder may further include a fixing portion fixed to a member outside the first holder.

According to the above-described configuration, since the first holder is fixed to the external member, the first holder is firmly fixed to the external member as compared with a case where the first holder is fixed to another member fixed to the external member. Therefore, displacement of the lens unit fixed to the support portion inside can be suppressed.

Alternatively, the second holder may further include a fixing portion fixed to a member outside the first holder.

As described above, according to the present invention, it is possible to provide a vehicle lamp capable of easily fixing a lens unit.

DESCRIPTION OF EMBODIMENTS

Figure 1:
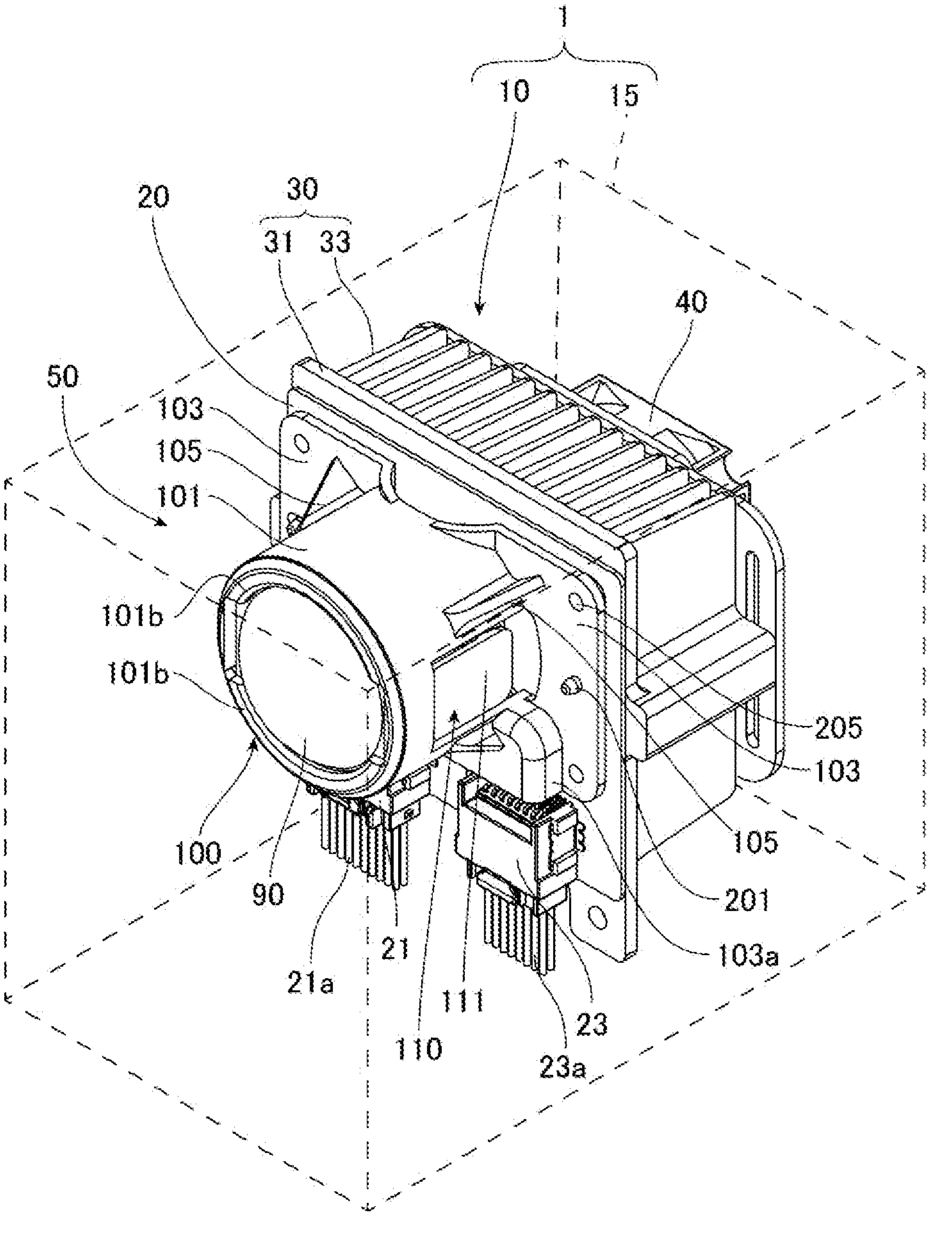
FIG. 1 is a schematic perspective view of a vehicle lamp according to a first embodiment.

Hereinafter, vehicle lamps according to preferred embodiments of the present invention will be described in detail with reference to the drawings. The following embodiments are intended to make it easy to understand the present invention, and are not intended to limit the present invention. The present invention can be modified and improved without departing from the gist thereof. In addition, in the present invention, constituent elements in the following embodiments may be appropriately combined. In the drawings referred to below, dimensions of members may be changed for easy understanding. In addition, in the drawings, for ease of viewing, only some of the similar components are denoted by reference numerals, and some reference numerals may be omitted.

First Embodiment

FIG. 1 is a schematic perspective view of a vehicle lamp according to the present embodiment. The vehicle lamp 1 is a headlight for an automobile. The vehicle lamp 1 according to the present embodiment includes a lamp unit 10 and a housing 15 that accommodates the lamp unit 10. Light emitted from the lamp unit 10 passes through a front surface of the housing 15.

Figure 2:
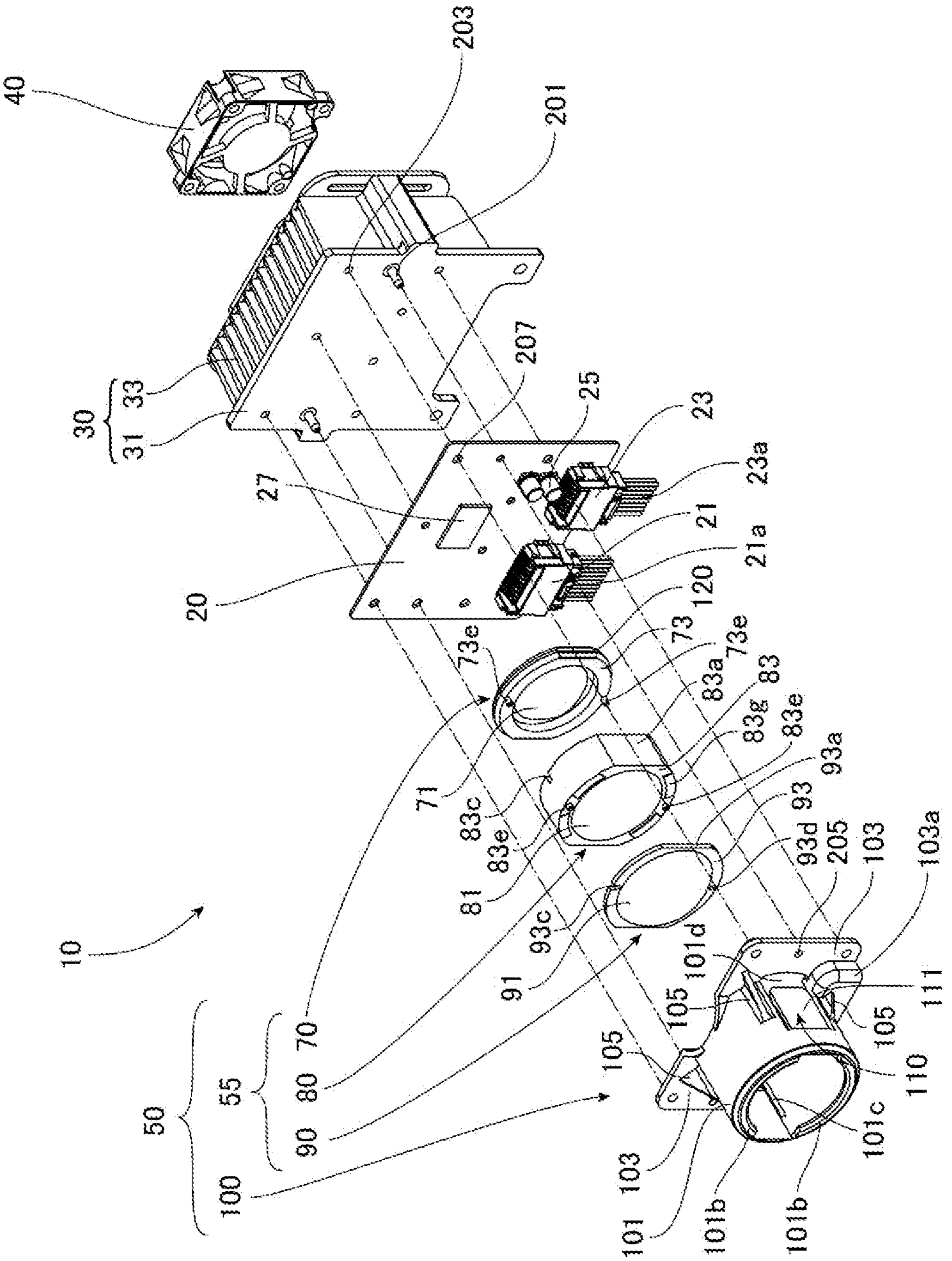
FIG. 2 is an exploded perspective view of a lamp unit according to the first embodiment.

FIG. 2 is an exploded perspective view of the lamp unit 10 according to the present embodiment. The lamp unit 10 includes a substrate 20, a heat sink 30, a fan 40, and an optical unit 50.

The substrate 20 is a plate member disposed along the vertical direction. A control connector 21 to which a control cable 21*a* is connected, a power supply connector 23 to which a power supply cable 23*a* is connected, an electronic component 25 such as a capacitor, and a light source unit 27 are mounted on the substrate 20.

The control cable 21*a* is connected to a control board (not illustrated), and the control board controls the electronic component 25 and the light source unit 27 through the control cable 21*a* and the substrate 20. The power supply cable 23*a* is connected to a power supply (not illustrated), and the power supply supplies power to the light source unit 27 through the power supply cable 23*a* and the substrate 20. The power supply is also electrically connected to the control board. The control connector 21 and the power supply connector 23 are arranged on the left and right sides, the electronic component 25 is disposed above the power supply connector 23, and the light source unit 27 is disposed above the control connector 21, the power supply connector 23, and the electronic component 25 and substantially at the center of the substrate 20.

The light source unit 27 includes a plurality of light emitting units. An example of each light emitting unit includes a light emitting diode (LED). Such light emitting units are arranged, for example, in a matrix form in the vertical direction and the horizontal direction. When supplied with power, the light emitting units emit light forward. Each of the light emitting units can be controlled by the control board to individually change whether to emit light and a light emission amount. The configuration and arrangement of the light emitting units are not particularly limited as long as the light emitting units can emit light.

The heat sink 30 includes a base plate 31 that is a plate member on which the substrate 20 is disposed, and a plurality of heat dissipation fins 33 arranged in parallel on a side of the base plate 31 opposite to the substrate 20.

The fan 40 is disposed at rear ends of the plurality of heat dissipation fins 33. The fan 40 has an impeller (not illustrated), and blows air from behind the heat dissipation fins 33 to between the heat dissipation fins 33 by rotating the impeller to cool the heat sink 30.

The optical unit 50 includes a lens unit 55 that adjusts a divergence angle of light incident from the light source unit 27, and a holder 100 that supports the lens unit 55. FIG. 2 illustrates an example in which the lens unit 55 includes three lenses 70, 80, and 90.

The lenses 70, 80, and 90 are arranged to overlap each other in a thickness direction, and in a direction in which light travels from the light source unit 27, the lens 70 is arranged at the tail, the lens 90 is arranged at the head, and the lens 80 is arranged between the lens 70 and the lens 90. The lens 70 is disposed in front of the light source unit 27. The lenses 70, 80, and 90 are formed of, for example, resin or glass. Each of the lenses 70, 80, and 90 includes a main body portion through which light is transmitted from the light source unit 27, and an outer peripheral portion provided on an outer periphery of the main body portion. The respective main body portions will be referred to as main body portions 71, 81, and 91, and the respective outer peripheral portions will be referred to as outer peripheral portions 73, 83, and 93.

The outer shape of each of the outer peripheral portions 73, 83, and 93 is substantially an oval track shape elongated in the vertical direction by cutting a circle into a planar shape on the left and right sides in a front view. Locked portions 120 are formed on the left and right sides of the outer peripheral portion 73. Flat portions 83*a* and 93*a* are formed on the left and right sides of the outer peripheral portions 83 and 93, respectively. In a front view of the optical unit 50, the flat portions 83*a* and 93*a* overlap each other and are located inside the locked portions 120.

Protrusions 73*e* are provided on the upper and lower sides of the front surface of the outer peripheral portion 73. The protrusions 73*e* are positioned symmetrically with respect to the main body portion 71.

A slit 83*c* and a hole (not illustrated) are provided on a rear surface of the outer peripheral portion 83. The slit 83*c* is located to correspond to one of the protrusions 73*e*, and is open upward. The hole is located to correspond to the other one of the protrusions 73*e*. The protrusions 73*e* are individually engaged with the slit 83*c* and the hole. In addition, similarly to the pair of protrusions 73*e*, a pair of protrusions 83*e* are provided on the upper and lower sides of the front surface of the outer peripheral portion 83.

Similarly to the slit 83*c* and the hole (not illustrated) of the outer peripheral portion 83, a slit 93*c* and a hole 93*d* are provided on the rear surface of the outer peripheral portion 93. The slit 93*c* is located to correspond to one of the protrusions 83*e*, and the hole 93*d* penetrates the outer peripheral portion 93 in the front-rear direction, and is located to correspond to the other one of the protrusions 83*e*. The protrusions 83*e* are individually engaged with the slit 93*c* and the hole 93*d*.

The lenses 70, 80, and 90 are assembled as one unit by individually engaging the protrusions 73*e* with the slit 83*c* and the hole and individually engaging the protrusions 83*e* with the slit 93*c* and the hole 93*d*. In addition, the lenses 70, 80, and 90 are positioned in the circumferential direction relative to each other by the above-described engagement. Note that a protrusion 83*g* is provided on the front surface of the outer peripheral portion 83 of the lens 80, and a protrusion (not illustrated) is also provided on the rear surface of the outer peripheral portion 83. When the lenses 70, 80, and 90 are assembled, the protrusion 83*g* abuts on the rear surface of the outer peripheral portion 93, and the protrusion (not illustrated) provided on the rear surface of the outer peripheral portion 83 abuts on the front surface of the outer peripheral portion 73.

The holder 100 has a light shielding property and elasticity, and is formed of, for example, a resin. The holder 100 includes a cylindrical support portion 101 extending in the front-rear direction, a pair of left and right plate-shaped fixing portions 103, and reinforcing plates 105 substantially perpendicular to the support portion 101, all of which are integrally formed.

Inside the support portion 101, the lenses 70, 80, and 90 of the lens unit 55 are fixed side by side in the front-rear direction of the support portion 101. In the support portion 101, the lens 90 is located on the front end side of the support portion 101, and the lens 70 is located on the rear end side of the support portion 101. The support portion 101 has, for example, a cylindrical shape, but the shape is not particularly limited. When the lenses 80 and 90 are disposed inside the support portion 101, a gap between the flat portions 83*a* and the inner peripheral surface of the support portion 101 and a gap between the flat portions 93*a* and the inner peripheral surface of the support portion 101 are formed.

The support portion 101 has a protrusion 101*b*. The protrusion 101*b* is provided in front of the lens 90 of the lens unit 55 in the support portion 101, and protrudes inward of the support portion 101. Such a protrusion 101*b* is, for example, an inner flange provided at a front edge of the support portion 101, but is not limited to the inner flange, and may be a member different from the support portion 101 and attached to the support portion 101. The protrusion 101*b* has an arc shape in a front view, and two protrusions are provided on the upper and lower sides. A front surface of the outer peripheral portion 93 of the lens 90 is pressed against the protrusions 101*b* as will be described below.

In addition, a protrusion 101*c* is provided on the inner peripheral surface of the support portion 101. The protrusion 101*c* extends in the front-rear direction, and is provided at a position corresponding to the flat portion 83*a* in a state where the lens 80 is disposed inside the support portion 101. When the lenses 70 and 80 are inserted into the support portion 101 from the rear end of the support portion 101 and travel inside the support portion 101 toward the front end side with the locked portions 120 and the flat portions 83*a* and 93*a* are along the vertical direction, the protrusion 101*c* slides on the flat portions 93*a* and 83*a*. In addition, in a state where the lenses 70, 80, and 90 are arranged inside the support portion 101, the protrusion 101*c* abuts on a peripheral surface of the outer peripheral portion 73, and restricts the rotation of the lenses 70, 80, and 90 as one unit in the circumferential direction of the support portion 101 in the support portion 101.

A U-shaped slit 101*d* is provided on a side wall of the support portion 101. The slit 101*d* penetrates the support portion 101 in the radial direction of the support portion 101. A pair of opposing sides of the U-shaped slit 101*d* extend in the front-rear direction, and the remaining one side extends in the circumferential direction of the support portion 101 and is provided on the rear end side of the support portion 101. A locking portion 110 is formed inside the slit 101*d*. The slit 101*d* and the locking portion 110 are provided on each of the left and right sides of the center axis of the support portion 101. The locking portion 110 and the slit 101*d* are provided at positions corresponding to the locked portion 120 and the flat portions 83*a* and 93*a* in a state where the lenses 70, 80, and 90 are arranged inside the support portion 101.

The locking portion 110 has an arm portion 111. The arm portion 111 is separated from the side wall by the slit 101*d* on the rear end side of the support portion 101 and both sides of the support portion 101 in the circumferential direction. The arm portion 111 is connected to the side wall on the front end side of the support portion 101, and is a part of the side wall. Such an arm portion 111 is elastically deformable in the radial direction of the support portion 101.

The right fixing portion 103 extends rightward from the right side at the rear end of the support portion 101, and the left fixing portion 103 extends leftward from the left side at the rear end of the support portion 101. Each fixing portion 103 is fixed to the substrate 20 as will be described below. The fixing portion 103 is provided behind the lens 70 such that the lens 70 positioned inside the support portion 101 is separated forward from the substrate 20 and the light source unit 27 when each fixing portion 103 is fixed to the substrate 20. Each fixing portion 103 has a cover portion 103*a*. The cover portion 103*a* is formed by a part of each fixing portion 103 protruding forward. The cover portions 103*a* are positioned symmetrically with respect to the support portion 101, and the right cover portion 103*a* is provided at a position corresponding to the electronic component 25 in a state where each fixing portion 103 is fixed to the substrate 20 to cover the electronic component 25.

The reinforcing plates 105 are substantially triangular plate members, and are provided on the respective upper sides of the left and right fixing portions 103 and on the left and right cover portions 103*a*.

Each of the reinforcing plates 105 is connected to the outer peripheral surface of the support portion 101. In the circumferential direction of the support portion 101, the reinforcing plates 105 are provided on both sides of the slit 101*d* to overlap the slit 101*d*. The reinforcing plates 105 can suppress a decrease in strength of the support portion 101 caused by the slit 101*d*. In addition, the decrease in strength of the support portion 101 can be further suppressed as compared with that in a case where the reinforcing plates 105 do not overlap the slit 101*d* in the circumferential direction of the support portion 101.

Meanwhile, the base plate 31 has bosses 201 and screw holes 203. The fixing portion 103 also has screw holes 205. The bosses 201 and the screw holes 203 and 205 are provided at positions corresponding to screw holes 207 provided in the substrate 20. The bosses 201 are inserted into the screw holes 203 and 207 provided at positions corresponding to the bosses 201. Further, screws (not illustrated) are engaged with the screw holes 203, 205, and 207 into which the bosses 201 are not inserted. Further, other screws (not illustrated) are engaged with the bosses 201 and the screw holes 203 and 207 into which the screws are not inserted. As a result, the fixing portion 103 of the holder 100 is directly fixed to the substrate 20, which is a member outside the holder 100, and the substrate 20 is fixed to the heat sink 30.

Figure 3:
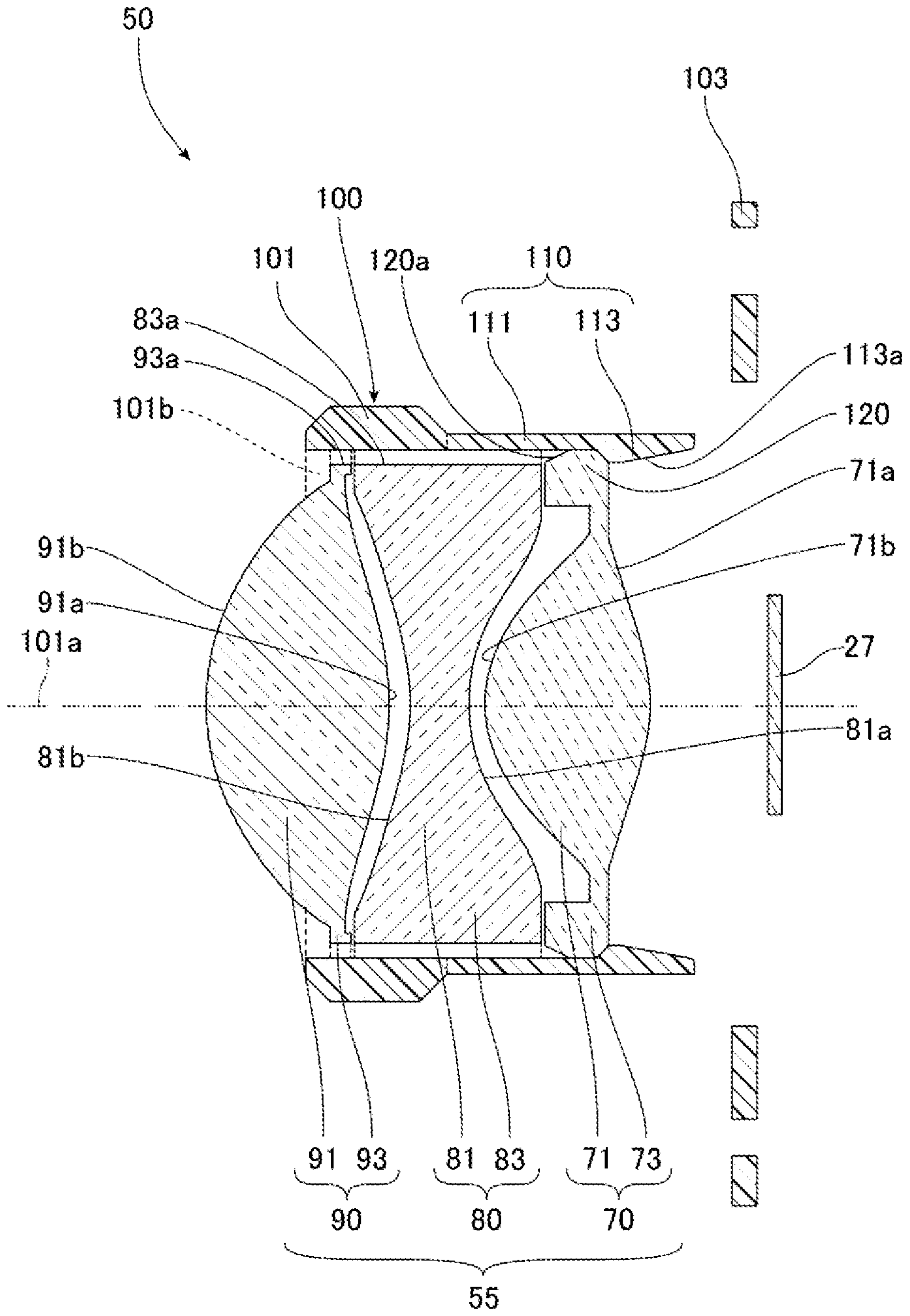
FIG. 3 is a horizontal cross-sectional view of an optical unit according to the first embodiment.

FIG. 3 is a horizontal cross-sectional view of the optical unit 50 according to the present embodiment in a state where the lenses 70, 80, and 90 are arranged inside the support portion 101.

Concerning the main body portions 71, 81, and 91 of the lenses 70, 80, and 90 arranged along a central axis 101*a* of the support portion 101, the main body portion 71 has an incident surface 71*a* curved rearward in a convex shape and an emission surface 71*b* curved forward in a convex shape for light from the light source unit 27. In the main body portion 91 has an incident surface 91*a* and an emission surface 91*b* curved similarly to the incident surface 71*a* and the emission surface 71*b*. Furthermore, contrary to the main body portion 71, the main body portion 81 has an incident surface 81*a* curved forward in a concave shape and an emission surface 81*b* curved rearward in a concave shape for light from the light source unit 27. Meanwhile, as described above, the protrusion 83*g* of the outer peripheral portion 83 abuts on the rear surface of the outer peripheral portion 93, and the protrusion (not illustrated) provided on the rear surface of the outer peripheral portion 83 abuts on the front surface of the outer peripheral portion 73. Therefore, as illustrated in FIG. 3, the front surface of the outer peripheral portion 83 is not in contact with the outer peripheral portion 93, and the rear surface of the outer peripheral portion 83 is not in contact with the outer peripheral portion 73.

The locking portion 110 further includes a claw portion 113. The claw portion 113 is disposed on an inner peripheral surface and a rear end portion of the arm portion 111. The claw portion 113 is positioned closer to the front end of the support portion 101 than the fixing portion 103. The claw portion 113 is provided at a position corresponding to the locked portion 120 provided on the outer peripheral portion 73 of the lens 70 in a state where the lenses 70, 80, and 90 are arranged inside the support portion 101, and protrudes inward. The claw portion 113 has an inclined surface 113*a* inclined outward in the radial direction of the support portion 101 from the front side to the rear side.

The claw portion 113 is positioned outside the flat portions 83*a* and 93*a* in the radial direction of the support portion 101. Therefore, while the lenses 80 and 90 is passing the claw portion 113, the claw portion 113 can be suppressed from coming into contact with the flat portions 83*a* and 93*a*, suppressing wear of the claw portion 113 caused by contact. An inclined surface 120*a* is provided at a front edge of the locked portion 120 of the lens 70. Similarly to the inclined surface 113*a*, the inclined surface 120*a* is inclined outward in the radial direction of the support portion 101 from the front side to the rear side. While the lens 70 is passing the claw portion 113, the inclined surface 120*a* slides on the inclined surface 113*a* of the claw portion 113, and the arm portion 111 is pushed outward in the radial direction of the support portion 101 by the lens 70 and is opened outward due to elastic deformation. When the outer peripheral portion 73 has passed the claw portion 113, the arm portion 111 is closed inward by elastic deformation. As a result, the claw portion 113 is snap-fit coupled to a rear edge portion of the locked portion 120 of the lens 70, and presses the locked portion 120 toward the front end of the support portion 101. The outer peripheral portion 73 of the lens 70 having the locked portion 120 presses the outer peripheral portion 83 toward the front end via a protrusion (not illustrated) of the outer peripheral portion 83 abutting on the outer peripheral portion 73, and the outer peripheral portion 83 of the lens 80 presses the outer peripheral portion 93 of the lens 90 toward the front end via the protrusion 83*g*. As a result, the outer peripheral portion 93 of the lens 90 is pressed against the protrusion 101*b*, and the lenses 70, 80, and 90 of the lens unit 55 are sandwiched between the locking portion 110 and the protrusion 101*b*.

As described above, in the vehicle lamp 1 according to the present embodiment, the locking portion 110 presses the locked portion 120 toward the front end of the support portion 101, and the lenses 70, 80, and 90 of the lens unit 55 are sandwiched between the locking portion 110 and the protrusion 101*b*.

In the above-described configuration, since the lens unit 55 is directly held by the holder 100, a movement of the lens unit 55 can be suppressed. In addition, since the locked portion 120 locked to the locking portion 110 is pressed by the locking portion 110 toward the front end of the support portion 101 and the lens unit 55 is sandwiched between the locking portion 110 and the protrusion 101*b*, a movement of the lens unit 55 can be suppressed. Therefore, the lens unit 55 can be easily fixed as compared with a case where the lens unit fixed to the holder using a metal fitting or a clip provided separately from the holder.

In addition, the holder 100 further includes a fixing portion 103 fixed to the substrate 20, which is a member outside the holder 100. According to the above-described configuration, since the holder 100 is fixed to the external member, the holder 100 is firmly fixed to the external member as compared with a case where the holder 100 is fixed to another member fixed to the external member. Therefore, displacement of the lens unit 55 fixed to the support portion 101 inside can be suppressed. Note that the external member may be the base plate 31.

Second Embodiment

Next, a second embodiment of the present invention will be described. Note that configurations similar to those described above will be denoted by the same reference numerals, and redundant description will be omitted unless otherwise specified.

Figure 4:
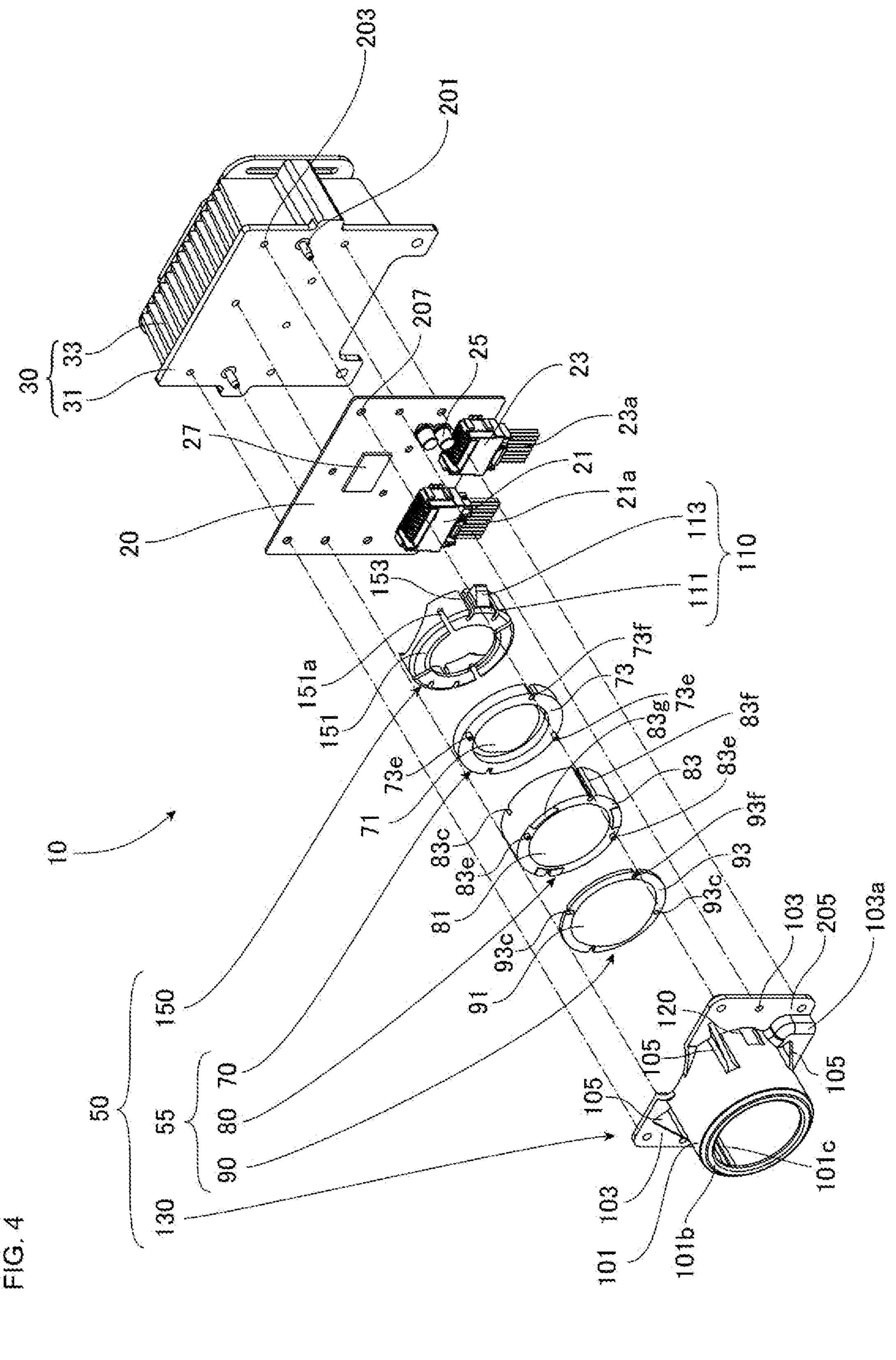
FIG. 4 is an exploded perspective view of a lamp unit according to a second embodiment.

FIG. 4 is an exploded perspective view of the lamp unit 10 according to the present embodiment. In FIG. 4, the fan 40 is not illustrated. In the present embodiment, the configuration of the optical unit 50 is different from the configuration of the optical unit 50 according to the first embodiment.

The outer shape of each of the outer peripheral portions 73, 83, and 93 of the lenses 70, 80, and 90 is substantially an oval track shape elongated in the vertical direction in the first embodiment, but is a circular shape in the present embodiment in a front view. The outer peripheral portions 73, 83, and 93 have substantially the same diameter.

Slits 73*f* are provided on the left and right sides of the outer peripheral portion 73 instead of the locked portions 120. The slit 73*f* penetrates the outer peripheral portion 73 from the rear surface toward the front surface, and is open outward in the radial direction of the outer peripheral portion 73. Similarly to the slits 73*f*, slits 83*f* and 93*f* are provided on the left and right sides of the outer peripheral portions 83 and 93, respectively, instead of the flat portions 83*a* and 93*a*. When the lenses 70, 80, and 90 are assembled, the slits 73*f*, 83*f*, and 93*f* are provided on the same straight line.

The optical unit 50 according to the present embodiment includes a first holder 130 and a second holder 150 instead of the holder 100. The first holder 130 and the cylindrical second holder 150 have a light shielding property and elasticity, and are formed of, for example, a resin.

The configuration of the first holder 130 is the same as the configuration of the holder 100 according to the first embodiment, but is different in that a locked portion 120 that is an opening is provided instead of the slit 101*d* and the locking portion 110 and in that the protrusion 101*b* has a ring shape. The locked portion 120 is provided on the side wall of the support portion 101 and penetrates the support portion 101 in the thickness direction. The locked portion 120 is provided on each of the left and right sides of the central axis 101*a* of the support portion 101, and is provided between the reinforcing plate 105 and the cover portion 103*a* in the circumferential direction of the support portion 101. The locked portion 120 is located on the rear end side of the support portion 101, and is continuous with the fixing portion 103.

The support portion 101 according to the present embodiment has a protrusion 101*c* similarly to the first embodiment. In the present embodiment, when the lenses 70, 80, and 90 are inserted into the support portion 101 from the rear end of the support portion 101, the protrusion 101*c* is slide-fitted into the slits 73*f*, 83*f*, and 93*f*. As a result, the rotation of the lenses 70, 80, and 90 in the circumferential direction of the support portion 101 in the support portion 101 is restricted.

Similarly to the fixing portion 103 according to the first embodiment, the fixing portion 103 of the first holder 130 is directly fixed to the substrate 20, which is a member outside the first holder.

The second holder 150 has, for example, a cylindrical shape, but the shape is not particularly limited. The second holder 150 is disposed closer to the rear end of the support portion 101 than the lens 70 inside the support portion 101. The lens 70 is disposed on the second holder 150. Specifically, an inner flange 151 is provided at a front edge of the second holder 150, and the outer peripheral portion 73 of the lens 70 is disposed on the inner flange 151. The inner flange 151 has a slit 151*a*, and the slit 151*a* extends from the inner flange 151 to a side wall of the second holder 150. The slit 151*a* makes it easy to elastically deform the inner flange 151. Two slits 151*a* are provided on each of the upper and lower sides. The slits are spaced apart from each other at substantially equal intervals in the circumferential direction of the second holder.

Four slits 153 are provided on the side wall of the second holder 150. The slit 153 extends in the front-rear direction on the side wall and further extends to the inner flange 151. Two of the slits 153 are provided on the right side of the central axis of the second holder 150, and the other two slits 153 are provided on the left side of the central axis of the second holder 150. Locking portions 110 are provided between the two left slits 153 and between the two right slits 153. Therefore, the locking portion 110 is provided on each of the left and right sides of the center axis of the second holder 150. The arm portion 111 of the locking portion 110 is separated from the side wall by the slits 153 at the rear end and on both sides in the circumferential direction of the second holder 150, and is connected to the inner flange 151 at the front end of the second holder 150. The claw portion 113 is disposed on an outer peripheral surface and a rear end portion of the arm portion 111. The claw portion 113 is provided at a position corresponding to the locked portion 120 of the first holder 130 in a state where the lenses 70, 80, and 90 and the second holder 150 are arranged inside the support portion 101. The claw portion 113 protrudes outward in the radial direction of the second holder 150.

Figure 5:
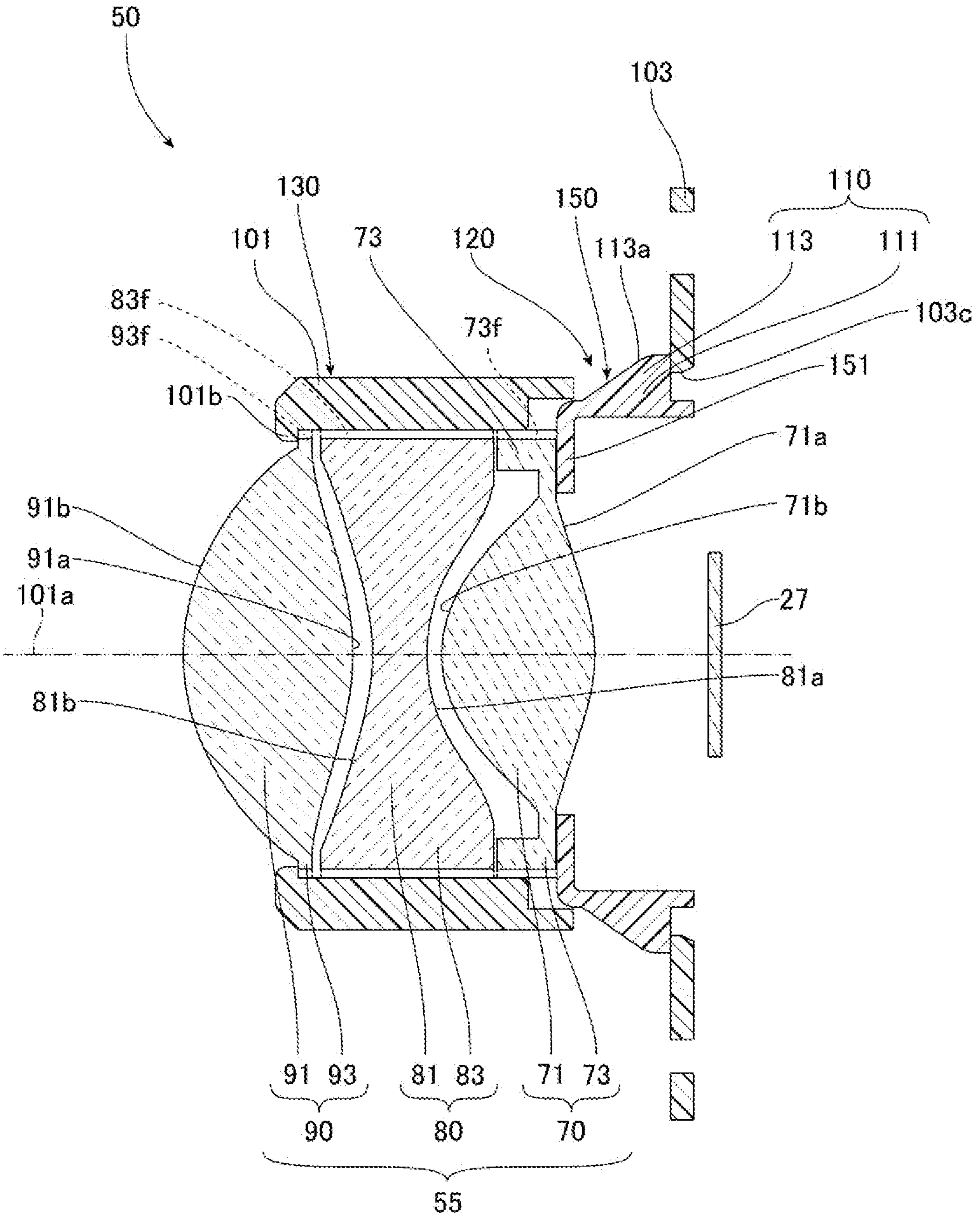
FIG. 5 is a horizontal cross-sectional view of an optical unit according to the second embodiment.

FIG. 5 is a horizontal cross-sectional view of the optical unit 50 according to the present embodiment in a state where the lenses 70, 80, and 90 and the second holder 150 are arranged inside the support portion 101. Similarly to the first embodiment, in the present embodiment, the protrusion 83*g* of the outer peripheral portion 83 abuts on the rear surface of the outer peripheral portion 93, and the protrusion (not illustrated) provided on the rear surface of the outer peripheral portion 83 abuts on the front surface of the outer peripheral portion 73.

Therefore, as illustrated in FIG. 5, the front surface of the outer peripheral portion 83 is not in contact with the outer peripheral portion 93, and the rear surface of the outer peripheral portion 83 is not in contact with the outer peripheral portion 73. Note that, in FIG. 5, the protrusions are not illustrated for ease of viewing.

After the lenses 70, 80, and 90 are inserted into the support portion 101, the second holder 150 is inserted into the support portion 101 from the rear end of the support portion 101. When the second holder 150 is inserted, the inclined surface 113*a* of the claw portion 113 slides on an edge 103*c* of the fixing portion 103 connected to an edge on the rear end side of the locked portion 120 that is an opening, the claw portion 113 and the arm portion 111 are pushed inward by the edge, and the arm portion 111 is closed inward by elastic deformation. When the second holder 150 is further inserted and the claw portion 113 is positioned at the locked portion 120, the arm portion 111 is opened outward by elastic deformation. As a result, the claw portion 113 is snap-fit coupled to the edge of the locked portion 120. At this time, the second holder 150 is disposed behind the lens 70, and the rear surface of the outer peripheral portion 73 of the lens 70 abuts on the inner flange 151. The rear surface of the outer peripheral portion 73 is also a rear surface of the lens unit 55. Then, the inner flange 151 presses the rear surface of the outer peripheral portion 73 of the lens 70 toward the front end of the first holder 130 by elastic deformation of the inner flange 151. While being pressed, the outer peripheral portion 73 of the lens 70 presses the outer peripheral portion 83 toward the front end via a protrusion (not illustrated) of the outer peripheral portion 83 abutting on the outer peripheral portion 73, and the outer peripheral portion 83 of the lens 80 presses the outer peripheral portion 93 of the lens 90 toward the front end via the protrusion 83*g*. As a result, the outer peripheral portion 93 of the lens 90 is pressed against the protrusion 101*b*, and the lenses 70, 80, and 90 are sandwiched between the second holder 150 and the protrusion 101*b*.

As described above, in the vehicle lamp 1 according to the present embodiment, when the locking portion 110 is locked to the locked portion 120, the second holder 150 presses the rear surface of the outer peripheral portion 73, which is the rear surface of the lens unit 55, toward the front end of the first holder 130, and the lens unit 55 is sandwiched between the second holder 150 and the protrusion 101*b*.

In the above-described configuration, since the second holder 150 presses the rear surface of the outer peripheral portion 73, which is the rear surface of the lens unit 55, toward the front end of the first holder 130, and the lens unit 55 is sandwiched between the second holder 150 and the protrusion 101*b* by locking the locking portion 110 to the locked portion 120, the movement of the lens unit 55 can be suppressed. Therefore, the lens unit 55 can be easily fixed as compared with a case where the lens unit fixed to the holder using a metal fitting or a clip provided separately from the holder.

In addition, the first holder 130 has a fixing portion 103 fixed to the substrate 20, which is a member outside the first holder 130. According to the above-described configuration, since the first holder 130 is fixed to the external member, the first holder 130 is firmly fixed to the external member as compared with a case where the first holder 130 is fixed to another member fixed to the external member. Therefore, displacement of the lens unit 55 fixed to the support portion 101 inside can be suppressed. Note that the external member may be the base plate 31.

In addition, in the optical unit 50 according to the present embodiment, the locked portion 120, which is an opening, is provided in the first holder 130, and the locking portion 110 is provided in the second holder 150. The second holder 150 is disposed closer to the rear end than the lens 70. Therefore, the locked portion 120, which is an opening, is also provided closer to the rear end than the lens 70. Therefore, as compared with a case where the locked portion 120 is provided to overlap the lenses 70, 80, and 90 in a side view of the support portion 101, light from the lenses 70, 80, and 90 can be suppressed from leaking from the locked portion 120. In addition, since the locked portion 120 is not provided on the side wall of the support portion 101 overlapping the lenses 70, 80, and 90, the design of the side wall can be improved.

Third Embodiment

Next, a third embodiment of the present invention will be described. Note that configurations similar to those described above will be denoted by the same reference numerals, and redundant description will be omitted unless otherwise specified.

Figure 6:
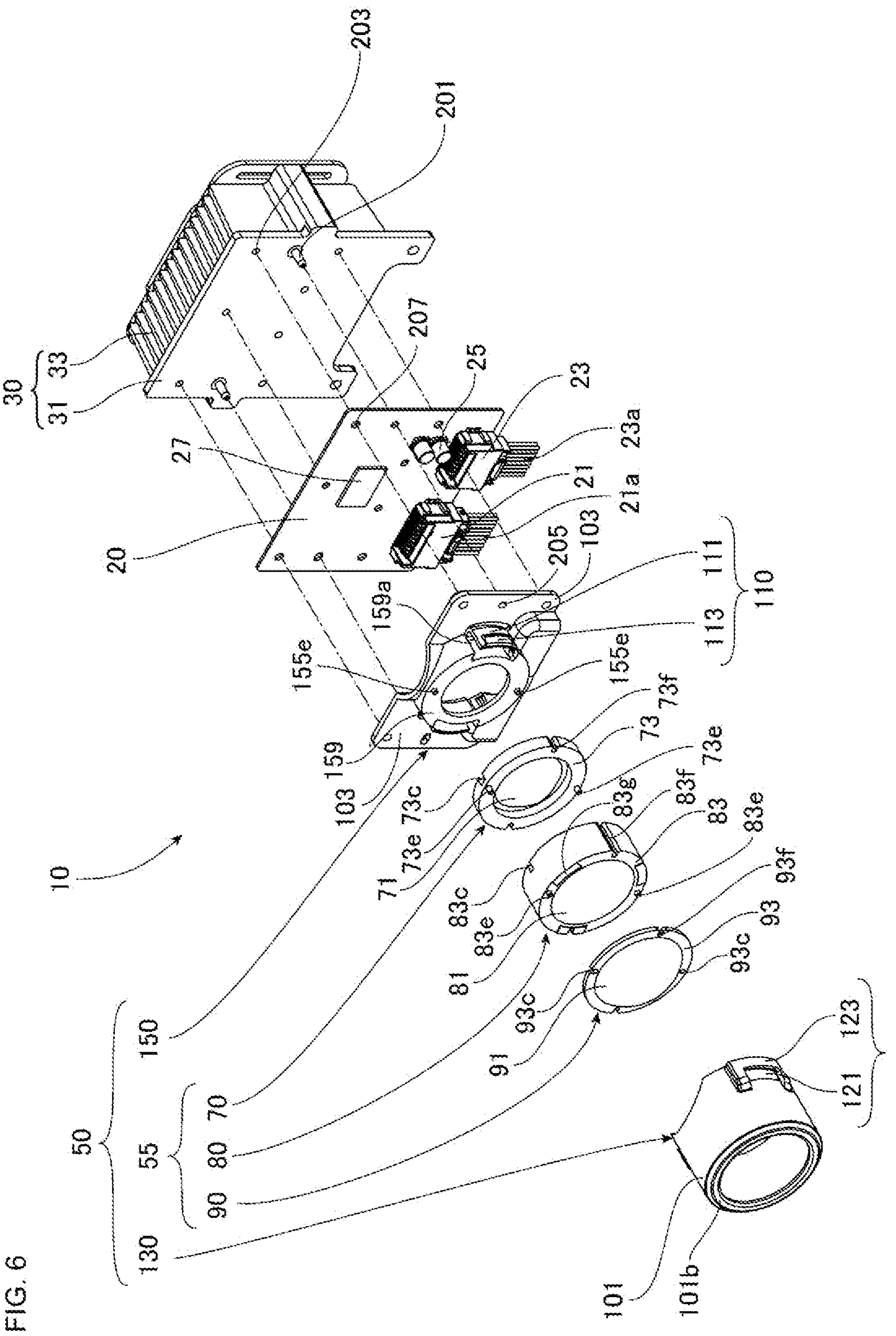
FIG. 6 is an exploded perspective view of a lamp unit according to a third embodiment.

FIG. 6 is an exploded perspective view of the lamp unit 10 according to the present embodiment. In FIG. 6, the fan 40 is not illustrated.

In the present embodiment, the configurations of the lenses 80 and 90 are the same as the configurations of the lenses 80 and 90 according to the second embodiment, but the configuration of the lens 70 is different from the configuration of the lens 70 according to the second embodiment in that a slit 73*c* and a hole (not illustrated) are provided on the rear surface of the outer peripheral portion 73. The slit 73*c* and the hole (not illustrated) are located symmetrically with respect to the main body portion 71. The slit 73*c* penetrates from the rear surface toward the front surface of the outer peripheral portion 73, and is open upward.

The lenses 70, 80, and 90 and the second holder 150 according to the present embodiment are assembled as one unit by a jig (not illustrated). The jig may be inserted into the slits 73*f*, 83*f*, and 93*f* to assemble the lenses as a unit.

In the present embodiment, the respective configurations of the first holder 130 and the second holder 150 are different from those in the second embodiment.

The first holder 130 according to the present embodiment has a support portion 101, and the support portion 101 includes a protrusion 101*b* and a locked portion 120. The protrusion 101*b* has the same configuration as that in the second embodiment. The locked portion 120 is provided on each of the left and right sides of the center axis of the support portion 101. The locked portion 120 includes an opening 121 and a U-shaped protrusion 123 provided at an edge of the opening 121. The opening 121 is provided on the side wall of the support portion 101 and penetrates the support portion 101 in the thickness direction. The protrusion 123 protrudes from the outer peripheral surface of the support portion 101, and is disposed on a part of the edge of the opening 121. A pair of opposing sides of the U-shaped protrusion 123 extend in the front-rear direction, and the remaining one side extends in the circumferential direction of the support portion 101 and is provided on the rear end of the opening.

The second holder 150 according to the present embodiment includes a cylindrical placement portion 159 extending in the front-rear direction, a pair of left and right plate-shaped fixing portions 103 substantially perpendicular to the placement portion 159, and a locking portion 110, all of which are integrally formed.

The placement portion 159 has, for example, a cylindrical shape, but the shape is not particularly limited. The outer peripheral portion 73 of the lens 70 is disposed on the front surface of the placement portion 159. Protrusions 155*e* are provided on the upper and lower sides of the front surface of the placement portion 159. The protrusions 155*e* are positioned symmetrically, one of the protrusions 155*e* is engaged with the slit 73*c* provided on the rear surface of the outer peripheral portion 73, and the other protrusion 155*e* is engaged with the hole (not illustrated) provided on the rear surface of the outer peripheral portion 73. Such engagement restricts the rotation of the lenses 70, 80, and 90 provided as one unit in the circumferential direction of the placement portion 159 with respect to the placement portion 159.

The right side fixing portion 103 extends rightward from the right side at the rear end of the placement portion 159, and the left side fixing portion 103 extends leftward from the left side at the rear end of the placement portion 159. Similarly to the fixing portions 103 according to the first embodiment, the left and right fixing portions 103 of the second holder 150 are directly fixed to the substrate 20. The fixing portions 103 may be fixed to the base plate 31, which is an external member.

The locking portions 110 are provided on the left and right sides of the side wall of the placement portion 159 with the central axis of the placement portion 159 interposed therebetween. The arm portion 111 of the locking portion 110 has an L shape in a top view. The L-shaped arm portion 111 includes one side connected to the rear end of the placement portion 159 and the other side on which the claw portion 113 is disposed. One side extends outward in the radial direction of the placement portion 159. The other side extends toward the support portion 101 in the front-rear direction. The claw portion 113 is provided on the outer peripheral surface of the other side of the arm portion. The claw portion 113 protrudes outward in the radial direction of the placement portion 159. In addition, a notch 159*a* is provided in a portion of the side wall of the placement portion 159 facing the other side of the arm portion so that the other side of the arm portion can be bent inward by elastic deformation.

Figure 7:
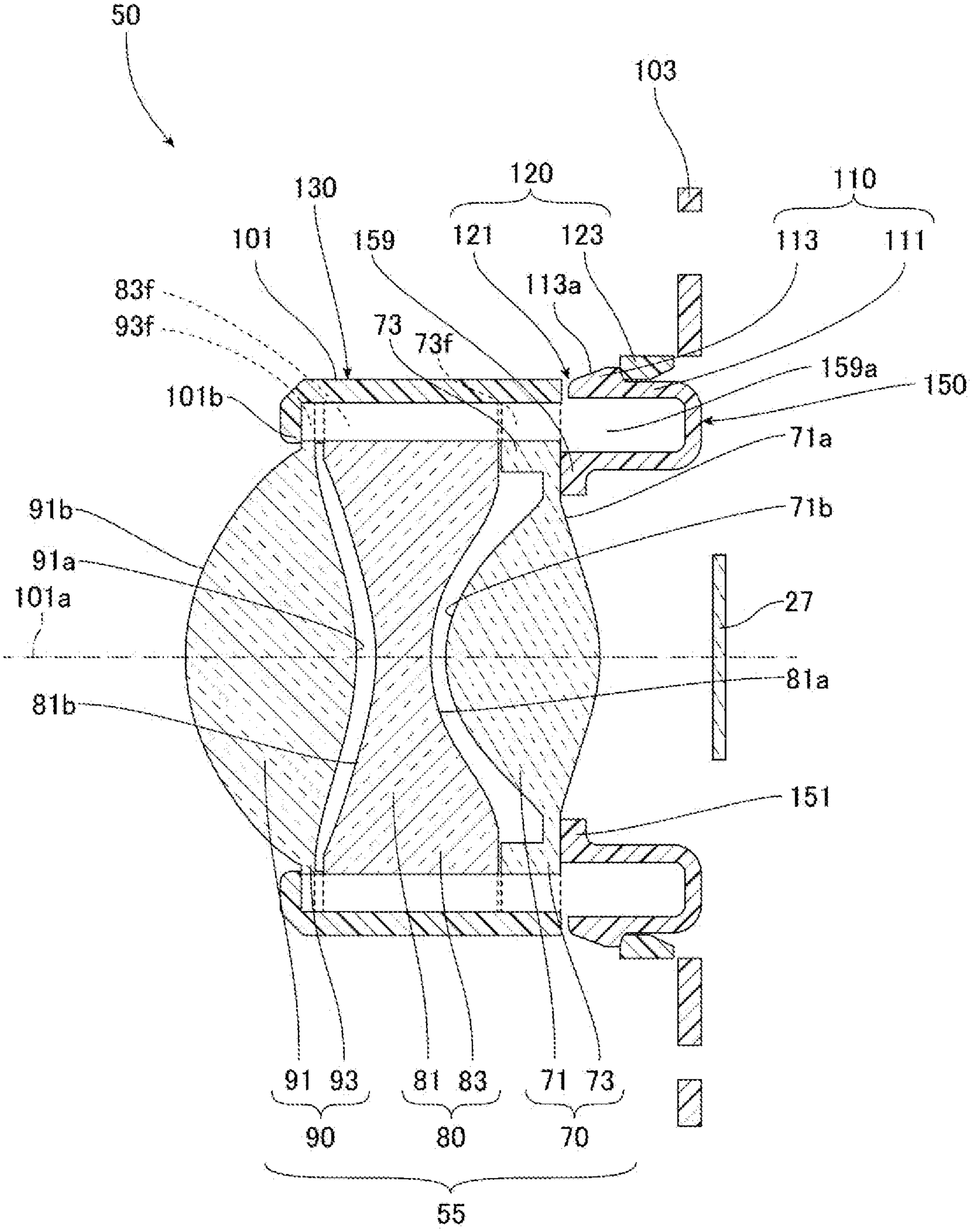
FIG. 7 is a horizontal cross-sectional view of an optical unit according to the third embodiment.

FIG. 7 is a horizontal cross-sectional view of the optical unit 50 according to the present embodiment in a state where the lenses 70, 80, and 90 and the placement portion 159 are arranged inside the support portion 101.

Similarly to the first embodiment, in the present embodiment, the protrusion 83*g* of the outer peripheral portion 83 abuts on the rear surface of the outer peripheral portion 93, and the protrusion (not illustrated) provided on the rear surface of the outer peripheral portion 83 abuts on the front surface of the outer peripheral portion 73. Therefore, as illustrated in FIG. 7, the front surface of the outer peripheral portion 83 is not in contact with the outer peripheral portion 93, and the rear surface of the outer peripheral portion 83 is not in contact with the outer peripheral portion 73. Note that, in FIG. 7, the protrusions are not illustrated for ease of viewing.

When the lenses 70, 80, and 90 are placed on the placement portion 159 together with the support portion 101, the inclined surface 113*a* of the claw portion 113 slides on the inner peripheral surface of the support portion 101, the claw portion 113 and the arm portion 111 are pushed inward by the support portion 101, and the arm portion 111 is closed inward by elastic deformation. Since the notch 159*a* is provided in the side wall of the placement portion 159, the locking portion 110 is further closed inward. When the claw portion 113 is positioned in the opening 121 of the locked portion 120, the arm portion 111 is opened outward by elastic deformation. As a result, the claw portion 113 is snap-fit coupled to the edge of the opening 121 and the protrusion 123 of the locked portion 120. At this time, the front surface of the placement portion 159 presses the rear surface of the outer peripheral portion 73 of the lens 70 toward the front end of the first holder 130. Then, the outer peripheral portion 73 of the lens 70 presses the outer peripheral portion 83 of the lens 80 toward the front end side, and the outer peripheral portion 83 of the lens 80 presses the outer peripheral portion 93 of the lens 90 toward the front end side. As a result, the outer peripheral portion 93 of the lens 90 is pressed against the protrusion 101*b*, and the lenses 70, 80, and 90 are sandwiched between the second holder 150 and the protrusion 101*b*.

As described above, in the vehicle lamp 1 according to the present embodiment, when the locking portion 110 is locked to the locked portion 120, the second holder 150 presses the rear surface of the lens unit 55 toward the front end of the first holder 130, and the lens unit 55 is sandwiched between the second holder 150 and the protrusion 101*b*.

In the above-described configuration, since the second holder 150 presses the rear surface of the outer peripheral portion 73, which is the rear surface of the lens unit 55, toward the front end of the first holder 130, and the lens unit 55 is sandwiched between the second holder 150 and the protrusion 101*b* by locking the locking portion 110 to the locked portion 120, the movement of the lens unit 55 can be suppressed. Therefore, the lens unit 55 can be easily fixed as compared with a case where the lens unit fixed to the holder using a metal fitting or a clip provided separately from the holder.

In the present embodiment, the protrusions 155*e* are individually engaged with the slit 73*c* and the hole (not illustrated). As a result, the lens 70 closest to the light source unit 27 can be restricted from rotating with respect to the placement portion 159.

Although the present invention has been described by taking the above-described embodiments as examples, the present invention is not limited thereto.

For example, although the headlight has been described as an example of the vehicle lamp 1, the vehicle lamp 1 is not limited to the headlight as long as it is a lamp that emits light to the outside of the vehicle. For example, the vehicle lamp 1 may emit light rearward or laterally of the vehicle.

Although the lens unit 55 includes three lenses 70, 80, and 90 in the first, second, or third embodiment, the lens unit 55 may include at least one lens. In the optical unit 50 according to the second or third embodiment, the locking portion 110 is provided in the second holder 150, and the locked portion 120 is provided in the support portion 101. However, it is only needed that the locking portion 110 is provided in one of the support portion 101 and the second holder 150, and the locked portion 120 is provided in the other one of the support portion 101 and the second holder 150.

According to the present invention, a vehicle lamp capable of easily fixing a lens unit is provided, and can be used in the field of automobiles and the like.

The invention claimed is:

1. A vehicle lamp comprising:

a lens unit having a plurality of lenses arranged in a front-rear direction;

a holder including a cylindrical support portion to which the lens unit is fixed inside, and a protrusion provided closer to a front end of the support portion than the lens unit and protruding inward of the support portion;

a locking portion integrally formed with the support portion and elastically deformable in a radial direction of the support portion; and a locked portion provided in the lens unit and locked to the locking portion, wherein the locking portion has a claw portion that presses the locked portion toward the front end of the support portion, and the lens unit is sandwiched between the claw portion and the protrusion, each lens has a main body portion through which light is transmitted and an outer periphery portion provided on an outer periphery of the main body portion, the claw portion presses the locked portion on the outer periphery portion of the rearmost lens, and the outer periphery portion of the lens forward of the rearmost lens is located inside the claw portion.

2. The vehicle lamp according to claim 1, wherein the holder further includes a fixing portion fixed to a member outside the holder.

3. A vehicle lamp comprising:

a lens unit having at least one lens;

a first holder including a cylindrical support portion to which the lens unit is fixed inside, and a protrusion provided closer to a front end of the support portion than the lens unit and protruding inward of the support portion;

a second holder disposed closer to a rear end of the support portion than the lens unit inside the support portion;

a locking portion provided in one of the support portion and the second holder and elastically deformable in a radial direction of the support portion; and a locked portion provided in the other one of the support portion and the second holder and locked to the locking portion, wherein when the locking portion is locked to the locked portion, the second holder presses a rear surface of the lens unit toward a front end of the first holder, and the lens unit is sandwiched between the second holder and the protrusion; and the second holder further includes a fixing portion directly fixed to a member outside the first holder.

4. The vehicle lamp according to claim 3, wherein the first holder further includes a fixing portion fixed to a member outside the first holder.

* * * * *